United States Patent [19]
Nagaraj

[11] Patent Number: 6,041,084
[45] Date of Patent: *Mar. 21, 2000

[54] CIRCUIT FOR OPTIMAL SIGNAL SLICING IN A BINARY RECEIVER

[75] Inventor: Krishnaswamy Nagaraj, Somerville, N.J.

[73] Assignee: Lucent Technologies, Inc., Holmdel, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,231

[22] Filed: Aug. 15, 1997

[51] Int. Cl.$^7$ ..................................................... H04L 25/06
[52] U.S. Cl. .............................................. 375/317; 327/77
[58] Field of Search ..................................... 327/306, 307, 327/309, 331, 180, 77; 375/286, 317, 377, 318, 319, 219, 287, 257, 340, 285, 346, 345

[56] References Cited

U.S. PATENT DOCUMENTS

| | | |
|---|---|---|
| 3,579,239 | 5/1971 | Purcell, Jr. et al. . |
| 4,117,352 | 9/1978 | Thomas et al. .......................... 307/269 |
| 4,450,554 | 5/1984 | Steensma et al. . |
| 5,010,480 | 4/1991 | Natarajan ................................ 364/200 |
| 5,307,196 | 4/1994 | Kinoshita ................................ 375/318 |
| 5,430,765 | 7/1995 | Nagahori ................................ 375/318 |
| 5,486,869 | 1/1996 | Cooper .................................... 348/525 |
| 5,561,469 | 10/1996 | Schultz .................................... 348/476 |
| 5,666,167 | 9/1997 | Tults ........................................ 348/465 |
| 5,784,416 | 7/1998 | Yang et al. .............................. 375/341 |

*Primary Examiner*—Chi H. Pham
*Assistant Examiner*—Jean B Corrielus
*Attorney, Agent, or Firm*—Darby & Darby

[57] ABSTRACT

A slicer circuit receives a binary signal to be sliced at the midpoint of its amplitude with the portions of the sliced signal above the slicing level corresponding to a binary 1 and the portions below corresponding to a binary 0. The slicer has a fixed threshold level for slicing and a variable offset voltage is combined with the voltage level of the received binary signal to maintain the mid-point of the binary signal applied to the slicer at the slicer fixed threshold slicing level, which preferably is at a zero voltage level.

9 Claims, 4 Drawing Sheets

CIRCUIT FOR OPTIMAL SIGNAL SLICING IN A BINARY RECEIVER

FIELD OF THE INVENTION

The invention relates to a signal processing circuit for slicing binary signals in a receiver.

BACKGROUND OF THE INVENTION

Data communication using binary signals takes place at high rates in various applications. For example, in optical data systems, data transmission rates of 155 Mb/s and higher are utilized. In such binary data communication systems a receiver is used for receiving the binary signals from a transmitter. In many cases, the signals received are of a low level and are accompanied by noise. The true binary nature of a distinct rectangular pulse, usually designating a binary 1, sometimes can be partly obscured by noise and result in data errors that adversely affect signal processing equipment to which the output of the receiver is applied.

To improve the ability to accurately recapture the binary signals passing through the receiver before being supplied to other equipment, a slicing technique is employed. This involves slicing the received binary signal at a level about the midpoint of its amplitude, that is, between its maximum and minimum values. The portion of the received binary signal appearing above the slicing level corresponds to a binary 1 and the portion below the slicing level corresponds to a binary 0.

In one type of prior art slicer circuit, the slicing level is varied so as to be at the midpoint of the amplitude of the binary signal. This gives rise to problems in that there can be a variation of the slicing level from the desired midpoint value due to the shifting of the amplitude and reference level of the received signal and operational factors of the receiver itself. Therefore, a need exists to provide a slicing circuit in which the midpoint slicing level of the received signal is more accurately determined and maintained.

SUMMARY OF THE INVENTION

In accordance with the present invention, the received binary signal is applied to a slicer circuit that has a fixed slicing level. A variable offset voltage is added to the binary signal so that the signal applied to the slicer circuit will have its midpoint at the preset slicing level of the slicing circuit.

A preferred embodiment of the invention is used with a receiver operating with a fully differential binary signal, that is, one having a waveform both above (positive) and below (negative) a zero reference level. The variable offset voltage is produced by peak detecting each of the positive and negative binary signal waveforms and applying the detected peaks to a differential amplifier. The output of the differential amplifier is integrated and the integrated voltage is added as an offset to each of the positive and negative input binary signals. The addition of the offset voltage maintains the midpoint of each of the binary signal waveforms at the slicing level of the slicing circuit. The level shifted version of each of the binary signals is applied to the slicer circuit.

OBJECTS OF THE INVENTION

It is therefore an object of the invention to provide an improved binary signal slicer circuit.

Another object is to provide an improved binary signal slicer circuit for a receiver in which a variable offset voltage is applied to the received binary signal so that the midpoint of the amplitude of the binary signal is maintained at the fixed slicing level of the slicing circuit.

Still a further object is to provide a slicer circuit for a receiver in which the peak values of positive and negative binary signals are detected and are processed in a differential amplifier, the output of the differential amplifier is integrated and the result used to produce an offset voltage to be added to the binary signals to set the midpoint of the signals to the slicing level before application to the slicer.

BRIEF DESCRIPTION OF THE DRAWINGS

The foregoing and other objects of the invention will become more apparent upon reference to the following Detailed Description of the Invention and annexed drawings in which.

DETAILED DESCRIPTION OF THE INVENTION

Figure 1:
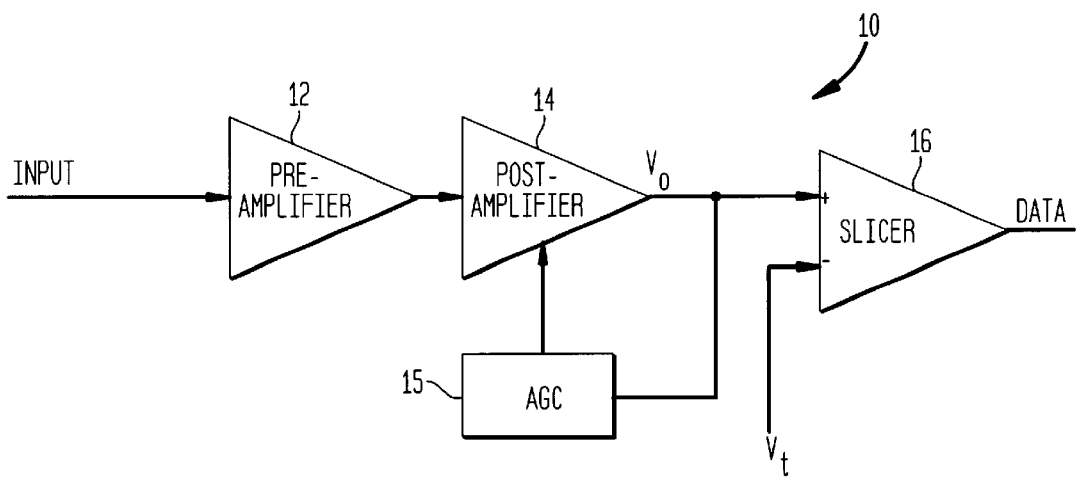
FIG. 1 is a schematic diagram of a prior art binary signal receiver employing a slicer.

FIG. 1 is a schematic diagram of a typical binary receiver 10 which is used, for example, at the receiving end of a fiber optic cable link. Such a receiver can be of the type formed by CMOS technology on a single integrated circuit chip as described in "A 50-Mbit/s CMOS Monolithic Optical Receiver" by Pietruszynski, Steininger and Swanson, IEEE Journal of Solid-State Circuits, Vol. 23, No. 6, December 1988.

The input signal to the receiver 10 comprises binary pulses which often are highly attenuated or deformed and are immersed in noise. The input signal is first amplified by a low noise pre-amplifier 12, which is typically a transimpedance amplifier. The output from the pre-amplifier is further amplified by a post-amplifier 14, typically to obtain an output amplitude of several hundred millivolts. Post-amplifier 14 has a conventional AGC feedback control loop 15.

The post amplifier output signal is sliced, i.e., shaped to be recognized as distinct pulses located on a reference voltage level, for further use. That is, signals above a certain threshold level are considered to correspond to binary 1, and those below the threshold level to correspond to binary 0. To accomplish this, the output of the post-amplifier 14 is applied to a slicer 16 whose operation level is set at a threshold voltage $V_T$.

Figure 2:
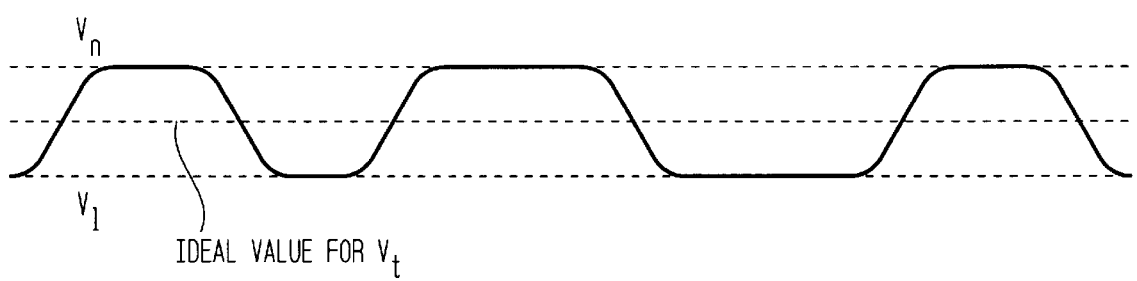
FIG. 2 shows a binary signal waveform to be sliced.

A typical waveform of the post-amplifier 14 output $V_o$ that is applied to the slicer 16 is shown in FIG. 2. For best noise immunity, the slicer reference level $V_T$ should be centered between the high level ($V_h$) and the low level ($V_l$) of the post amplifier 14 output. That is, the binary signal applied to the slicer should have its midpoint at the slicer reference level $V_T$. In a practical application, both $V_h$ and $V_l$ are subject to a significant amount of variation. $V_l$ (which should ideally be zero) can vary because of the "finite extinction ratio" of the transmitter. That is, a typical optical transmitter uses a laser diode whose output is kept on at full power, corresponding to a binary 1, and is switched to a reduced power level to produce a signal corresponding to a binary 0. Thus, the lower signal level corresponding to $V_l$ may not be at a true zero level.

$V_h$ (which should ideally be fixed) can vary because the automatic gain control (AGC) loop 15 around the post-amplifier 14 is often not made precise in order to simplify implementation of the integrated circuit. Because of this, the optimal midpoint amplitude of the binary signal is a variable parameter relative to the slicing threshold level $V_T$.

One way of overcoming the problem of a varying input signal level is to set the slicing reference level $V_T$ at the average of $V_h$ and $V_l$. A typical circuit for accomplishing this uses two peak detectors, one for detecting the peaks of $V_h$ and the other for detecting the peaks of $V_l$. The outputs of the two detectors are averaged to produce $V_T$. This approach has several problems. The first is that two different types of accurate peak detectors are required (a positive peak detector for determining $V_h$ and a negative peak detector for determining $V_l$). Implementing such different peak detectors, which would require different conductivity type transistors, is difficult for circuits capable of handling the high frequency signals which are typically encountered in binary optical data systems. Further, any errors in the averaging circuit adversely affect the accuracy of the slicing reference level. Also, it is difficult in practice to implement a high frequency slicer.

Figure 3:
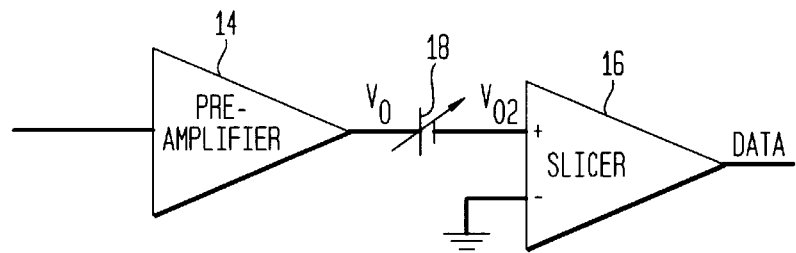
FIG. 3 is a schematic diagram of a receiver using a slicer circuit in accordance with the invention.

FIG. 3 shows a circuit according to the invention which can be used for more optimal slicing. Here, a variable offset voltage $V_{OS}$, schematically designated as being produced by a variable voltage source 18, is inserted in series with (added to) the binary output voltage $V_O$ of the post-amplifier 14 so as to produce a new output signal $V_{O2}$ to be applied to the input of slicer 16. The value of the offset voltage $V_{OS}$ is continuously adapted such that the mid-value of the pulses in signal $V_{O2}$ is equal to a fixed value, preferably zero, to be used as the threshold slicing voltage $V_T$. That is, the signal applied to slicer 16 is centered on a zero level.

Making the offset voltage $V_{OS}$ so as to keep the signal applied to the slicer at zero volts permits the slicer 16 to be a relatively simple circuit, such as a zero-crossing detector. The slicer, zero-crossing detector 16, operates to pass to both parts of the binary signal above and below the $V_T$ zero reference level as its data output. The detector 16 is represented in FIG. 3 as an operational amplifier whose positive input terminal is grounded and whose negative terminal receives the signal $V_{O2}$. The slicer 16 will thus have a zero voltage reference threshold $V_T$. Here also, the entire circuit can be implemented by CMOS technology on a single chip.

Figure 4:
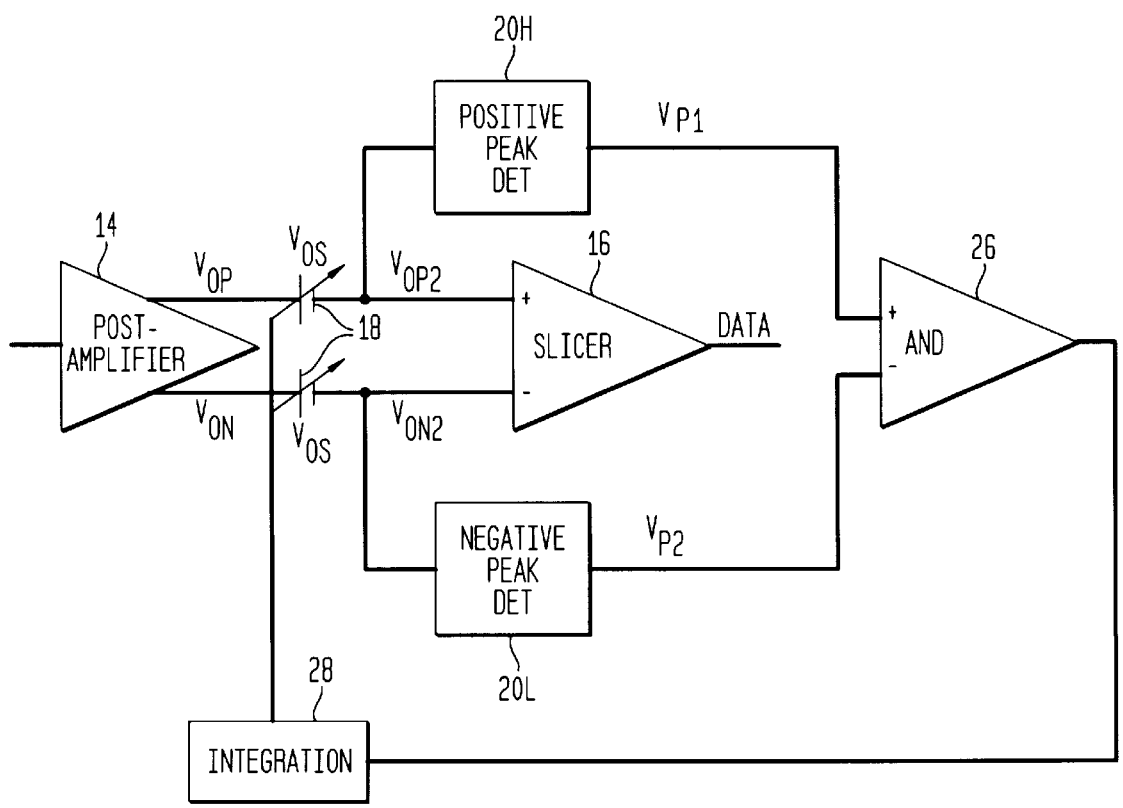
FIG. 4 is a schematic diagram of a circuit for producing an offset voltage to be added to the binary signals to be sliced.
Figure 5A:
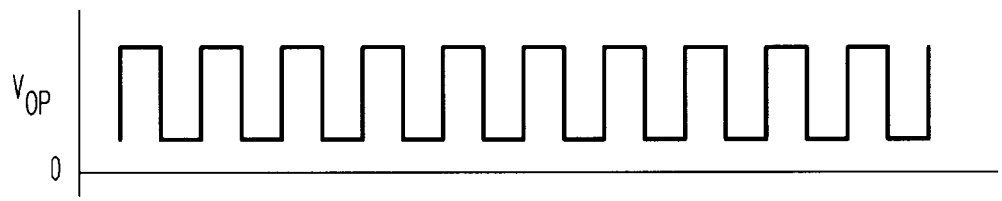
FIGS. 5A–5E are diagrams showing the waveforms at various points of the circuit of FIG. 4.
Figure 5B:
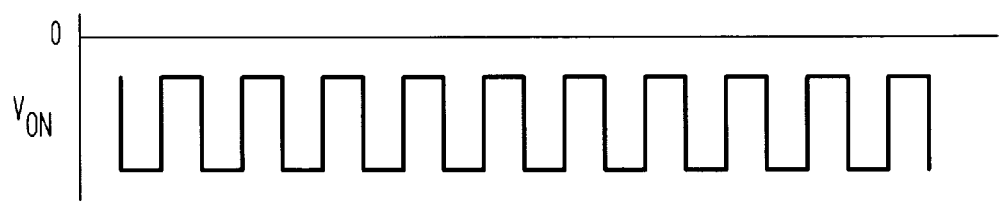
Figure 5C:
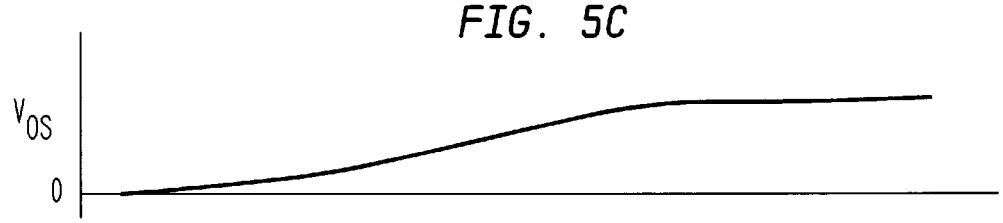
Figure 5D:
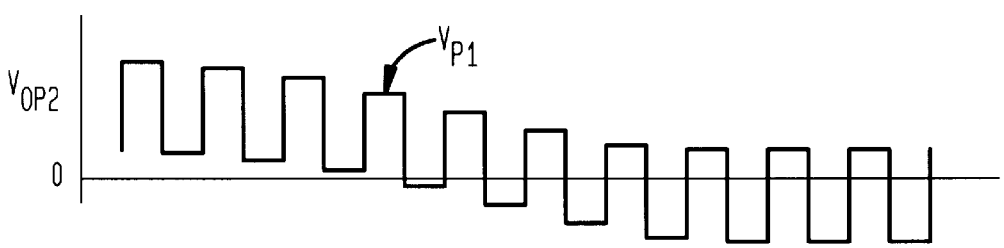
Figure 5E:
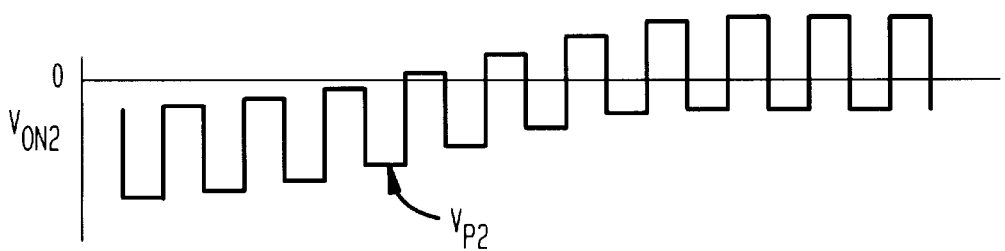

FIG. 4 shows an illustrative embodiment of a fully differential receiver circuit with a slicer in accordance with my invention, and FIG. 5 shows output waveforms for the circuit. This circuit is preferably implemented by CMOS technology. Here the post-amplifier 14 produces both positive and negative-going output binary signals $V_{OP}$ and $V_{ON}$ in response to the input signal. Two identical peak detectors 20H and 20L are provided, one connected to the respective positive and negative outputs of the post-amplifier 14. The peak detectors 20 are conventional and each operates to detect the peak value of the signal it receives. Each peak detector 20 receives the respective output $V_{OP}$ and $V_{ON}$ to which has been added an offset voltage $V_{OS}$. The output $V_{p1}$ and $V_{p2}$ of the two peak detectors 20H and 20L are applied to the respective positive and negative inputs of a differential amplifier 26 that detects the difference between the outputs of the two peak detectors 20. The amplified difference output signal of amplifier 26 is integrated by an integrator circuit 28, such as a capacitor. The output of integrator 28, which is a variable DC signal, is applied as the offset voltage $V_{OS}$, represented by 18, to each of the post-amplifier output signals $V_{OP}$ and $V_{ON}$ to produce the signals $VO_{p2}$ and $V_{ON2}$ which are applied to the inputs of the slicer 16. As shown by the opposite polarity elements 18, the offset voltages are of opposite polarity so that $V_{OS}$ adds to $V_{ON}$ and subtracts from $V_{OP}$.

The operation of the circuit of FIG. 4 is explained with reference to the waveforms shown in FIG. 5. In FIG. 5, lines a and b respectively show the corresponding outputs $V_{OP}$ and $V_{ON}$ of the post-amplifier 14. As seen, $V_{OP}$ is above the zero voltage level, while $V_{ON}$ is below the zero level. Line c shows the offset voltage $V_{OS}$ produced by integrator 28 as a varying positive polarity voltage. Line d shows the voltages $V_{OP2}$, which equals $V_{OP}-V_{OS}$, that is applied to the positive input of the slicer 16. This is the positive signal $V_{OP}$ of line a that has been shifted down toward the zero level in the value of $V_{OS}$. Line e shows the voltage $V_{ON2}$, which is $V_{ON}+V_{OS}$, that is applied to the negative input of slicer 16. This is the negative signal $V_{OP}$ that has been shifted up toward the zero level by the value $V_{OS}$. The dotted lines $V_{p1}$, and $V_{p2}$, are the respective peak voltage levels of the detectors 20H and 20L.

With the value of the offset voltage being $V_{OS}$, the output $V_{p2}$ of the peak detector 20L, has high and low levels of outputs $$\frac{V_h}{2} - V_{os} \text{ and } \frac{V_L}{2} - V_{os}$$

The output $V_{p2}$ of the peak detector 20L, has high and low levels of $$-\frac{V_L}{2} + V_{OS} \text{ and } -\frac{V_h}{2} + V_{OS}$$

The feedback loop of the amplifier 26 and integrator 28 adjusts the offset voltage $V_{OS}$ until the positive peaks, or the negative peaks if negative peak detectors are used, of the two signals $V_{p1}$, and $V_{p2}$ are equal. This occurs when $$V_{os} = \frac{v_h}{4} + \frac{v_L}{4}$$

It can be shown that under this condition both $V_{OP2}$ and $V_{ON2}$ pulse between the levels of $$\pm \frac{v_h - v_L}{4}$$

the only difference being that $V_{OP2}$ and $V_{ON2}$ are opposite in polarity.

The differential signal $V_{OP2}-V_{ON2}$, which is the difference of the signals applied to the inputs of the slicer 16, is $$\frac{v_h - v_L}{2}$$

This is an addition of the signals of lines d and e of FIG. 5. This value is centered exactly around zero, which is the mid-point.

The optimal slicer 16 for this output signal is a zero crossing detector. That is, the mid-point of the differential signal $V_{OP2}-V_{ON2}$ received by the slicer 16 is at zero level where slicing takes place. The output signals of the slicer above the zero level will be binary 1s and those below binary 0s. Since the slicer 16 is formed by a zero crossing detector, this not only automatically optimizes the slicing but also simplifies the slicer design.

The advantages of the circuit of FIG. 4 are as follows:

1. The amplified output applied to the slicer 16 is always centered around zero. This automatically optimizes the slicing. It also reduces the slicer to a simple zero crossing detector which is much easier to realize, especially at high frequencies.

2. The two peak detectors used are of the same type. That is, they can be implemented by transistors of the same conductivity type. This simplifies construction of the circuit. Also, the absolute accuracies of the peak detectors are inconsequential as long as they are matched.

3. The linearity and precision of the entire feedback loop are not critical to the operation of the circuit.

Figure 6:
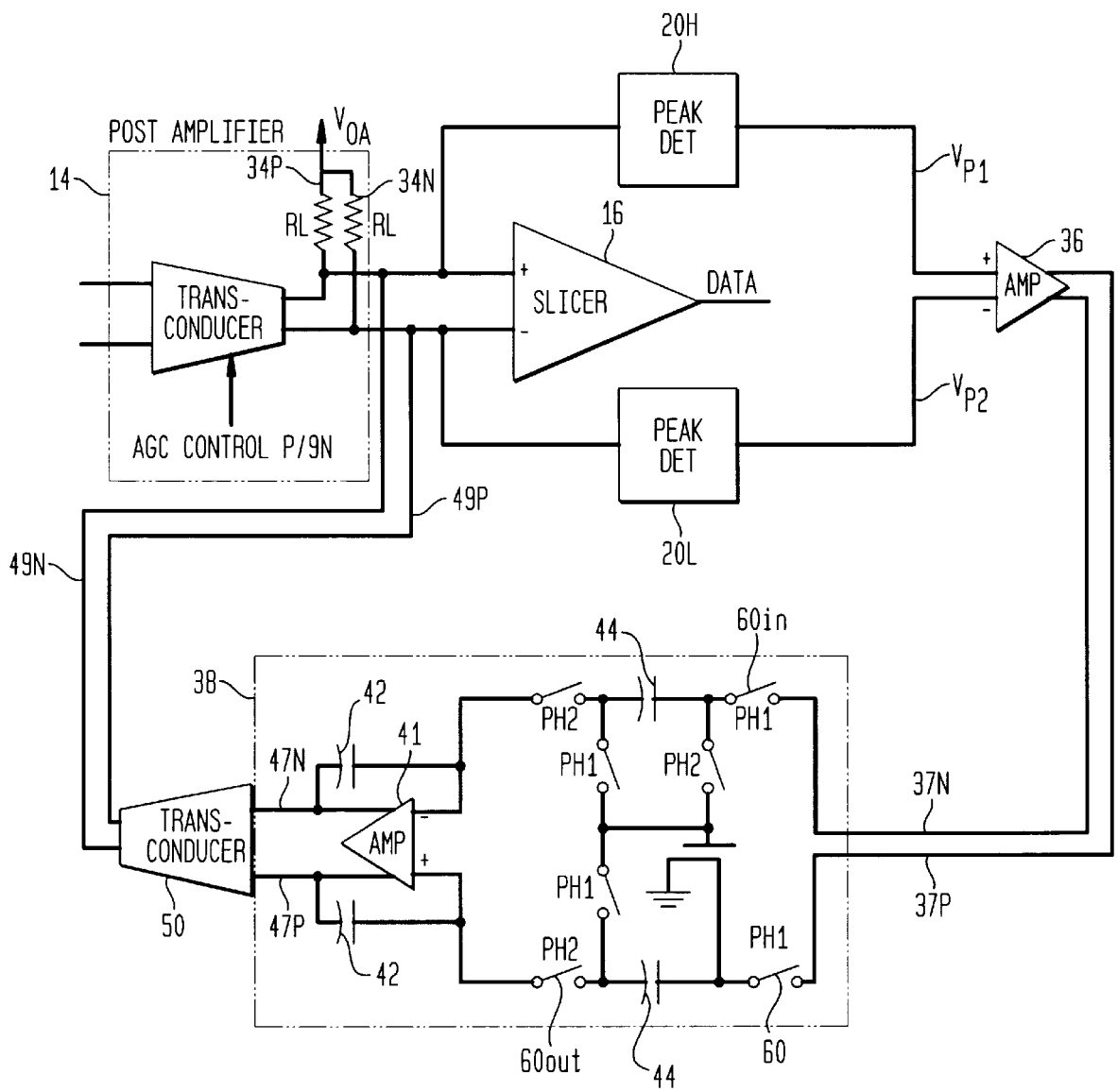
FIG. 6 is a schematic diagram of a circuit for developing the offset voltage.

The circuit of FIG. 4 diagrammatically shows the offset voltage sources 18 of the $\pm V_{OS}$ offset voltages as variable voltage sources. To implement such a configuration for a variable voltage, a variable current can be generated and applied across a load, such as a resistor, to generate the offset voltage. FIG. 6 shows a circuit for accomplishing this. In FIG. 6, the same numbers are used for the same components as in FIG. 4.

In FIG. 6, there are resistors 34P and 34N connected respectively between the positive and negative outputs of the post amplifier 14 on which $V_{OP}$ and $V_{ON}$ appear. The resistors 34 are usually part of the post amplifier. $V_{DD}$ is the voltage source for the transistors that typically comprise the circuit. The voltage $V_{OS}$ is developed across each of the resistors 34 by applying a current thereto, as described below. As explained above, the offset voltage $V_{OS}$ is added to $V_{OP}$ and $V_{ON}$ to produce the final voltages $V_{OP2}$ and $V_{ON2}$ to be applied to slicer 16.

Here, the positive and negative outputs $V_{OP}$ and $V_{ON}$ of the post amplifier 14, as modified by the offset voltage produced as described below, are applied to the positive and negative inputs of the slicer 16 and also to the positive and negative peak detectors 20H and 20L. The peak detectors 20H and 20L detect the peaks of the applied signals and produce the voltages $V_{P1}$, and $V_{P2}$ which are respectively applied to the positive and negative inputs of an amplifier 36.

Amplifier 36 differs from the previously described amplifier 26 in that it has a differential output instead of a single output as found in amplifier 26.

The positive and negative outputs of amplifier 36 appear on lines 37P and 37N which are connected to the respective inputs of an integrator, here shown as a conventional switched capacitor integrator 38. The integrator 38 includes an operational amplifier 41 with a capacitor 42 in the feedback path of each of its positive and negative channels. There are also capacitors 44 in each of the lines 37P and 37N at the inputs to the integrator 38.

Figure 6A:
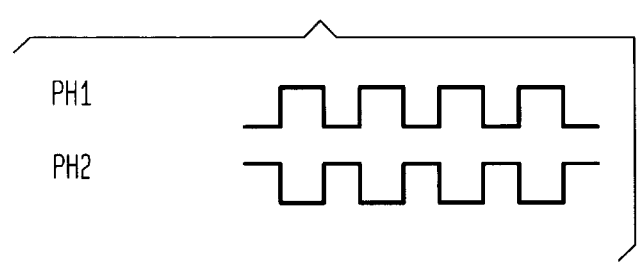
FIG. 6A is a diagram showing signals used with the circuit of FIG. 6.

A conductive type transmission gate 60, schematically represented by a double pole double throw switch whose center terminal is grounded, is connected on each side of each of the capacitors 44. Each transmission gate is energized (closed) by signals, such as clock pulses. The clock pulses, as shown in FIG. 6A, have a generally square wave shape, are of opposite polarity PH1 and PH2, and do not overlap. The clock pulses are produced by a conventional clock pulse generator (not shown).

One pole of the transmission gate 60-*in*, which is on the side of each of the capacitors 44 that receives the signals on line 37P and 37N, receives the clock pulses PH1, while the other poles connected to the grounded center terminal receives pulses PH2. The corresponding poles of the transmission gate 60-*out*, on the side of each capacitor connected to the inputs of amplifier 41, receives clock pulses PH2, while the poles connected to the grounded center terminal receives pulses PH1.

The two gates 60-*in* and 60-*out* operate the transmission gates to alternately switch between open and closed states. Pulses PH1 close gate 60-*in* so as to apply the signals on lines 37P and 37N to the plates of the capacitors 44 on the input gate 60-*in* side. At the same time, the pulses PH1 ground the terminals of capacitors 44 which are connected to the output gate 60-*out*. Accordingly, the output voltages on lines 37N and 37P charge the capacitors 44. Pulses PH2 ground the plate of the capacitors 44 connected to the input gate 60-*in* and connect the plates of the capacitors connected to output gate 60-*out* to the inputs of integrator amplifier 41 and its capacitors 42. This transfers the voltages from capacitors 44, which are the voltages from the peak detectors 20H and 20L, to the integrator amplifier 41.

The integrator amplifier produces positive and negative going voltages on output lines 47P and 47N which are applied to the inputs of a voltage-to-current converter 50. The converter 50 is a conventional transconductance element. Any other suitable voltage-to-current converting circuit can be used. Converter 50 produces currents on output lines 49P and 49N that are connected to resistors 34N and 34P of the post amplifier 14. The current on line 49N produces a DC voltage across the resistor 34P as a subtractive offset voltage to $V_{OP}$ and the current on line 49P produces a DC voltage across the resistor 34N as an additive offset voltage to $V_{ON}$. This is described above.

Due to the fact that the net loop gain in the feedback loop of the amplifier 36 and the switched capacitor integrator 38 is finite in practice, there will be a difference between the two peak detector outputs under equilibrium. This difference is inversely proportional to the overall loop gain. In a practical realization it is relatively easy to achieve a loop gain that is large enough to make this error negligible.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A circuit for amplitude slicing an electrical voltage signal to obtain binary type information comprising:

a slicer to receive said voltage signal and to slice said signal to generate a binary signal related to a midpoint of the voltage signal applied to said slicer, said midpoint being at a predetermined voltage level;

first and second peak detectors to receive said voltage signal and produce a respective output related to the positive and negative peaks of said voltage signal;

an offset circuit to receive the outputs of said first and second peak detectors and to produce an offset voltage from a differential of said outputs of said first and second peak detectors; and a combiner circuit which combines said voltage signal with said offset voltage to maintain the midpoint of the amplitude of said voltage signal received by said slicer at said predetermined voltage level.

2. A circuit as in claim 1 wherein said predetermined voltage level is zero volts and said offset voltage that is produced is combined with said voltage signal to set the midpoint of said voltage signal to be applied to said slicer at the zero volt level.

3. A circuit as in claim 2 wherein said slicer comprises a zero-crossing detector.

4. A circuit as in claim 1 wherein the offset voltage that is produced is combined with said voltage signal to be applied to said slicer to set the midpoint of the amplitude of said voltage signal received by said slicer at a zero volt level, and said first and second peak detectors each comprises a zero-crossing detector.

5. A circuit as in claim 1 wherein said voltage signal received by said slicer has positive and negative phases relative to said midpoint, said offset circuit comprising a differential amplifier and an integrator for receiving each of said positive and negative phases to produce said offset voltage.

6. A circuit as in claim 5, wherein said combiner is connected from the outputs of said integrator to the input of said slicer.

7. A circuit as in claim 5 wherein said predetermined voltage level is zero volts and offset voltage that is produced is combined with said voltage signal to set the midpoint of said voltage signal to be applied to said slicer at the zero volt level.

8. A circuit as in claim 5 wherein said differential amplifier produces positive and negative phases, and said integrator separately integrates said positive and negative phases to produce positive and negative offset voltages.

9. A circuit as in claim 8 wherein said voltage signal has positive and negative components on separate lines, and wherein said combiner comprises:

a dual input transconductance device which receives said positive and negative offset voltages and produces separate positive and negative offset currents at positive and negative current outputs, and first and second resistors of a post amplifier which are connected between a voltage source and the respective separate lines, the positive and negative current outputs of said dual transconductance device being connected to respective ones of said separate lines.

* * * * *